United States Patent
Liu et al.

(10) Patent No.: US 10,902,432 B2
(45) Date of Patent: Jan. 26, 2021

(54) SYSTEM AND METHOD FOR GENERATING CERTIFICATE FOR OFF-LINE RIDE HAILING

(71) Applicant: BEIJING DIDI INFINITY TECHNOLOGY AND DEVELOPMENT CO., LTD., Beijing (CN)

(72) Inventors: Tao Liu, Beijing (CN); Tuoya Wulan, Beijing (CN)

(73) Assignee: Beijing DiDi Infinity Technology and Development Co., Ltd., Beijing (CN)

(*) Notice: Subject to any disclaimer, the term of this patent is extended or adjusted under 35 U.S.C. 154(b) by 0 days.

(21) Appl. No.: 16/928,033

(22) Filed: Jul. 14, 2020

(65) Prior Publication Data
US 2020/0342457 A1 Oct. 29, 2020

Related U.S. Application Data

(63) Continuation of application No. PCT/CN2018/101631, filed on Aug. 22, 2018.

(51) Int. Cl.
*G06Q 20/40* (2012.01)
*G06Q 50/30* (2012.01)
(Continued)

(52) U.S. Cl.
CPC ......... *G06Q 20/407* (2013.01); *G06Q 20/047* (2020.05); *G06Q 20/108* (2013.01);
(Continued)

(58) Field of Classification Search
CPC .. G06Q 20/407; G06Q 20/047; G06Q 20/108; G06Q 30/0185; G06Q 40/02;
(Continued)

(56) References Cited

U.S. PATENT DOCUMENTS

2015/0161554 A1* 6/2015 Sweeney ........ G06Q 10/063114
705/7.15

FOREIGN PATENT DOCUMENTS

| CN | 103177412 A | | 6/2013 | |
|---|---|---|---|---|
| CN | 107016750 A | * | 4/2017 | ............... G07C 5/00 |
| CN | 107016750 A | | 8/2017 | |
| CN | 108038774 A | * | 5/2018 | ............. G06Q 10/02 |

(Continued)

OTHER PUBLICATIONS

J. Owen Cherrington, Developing an Event-Based Business Solution: The Case of IBM's National Employee Disbursement System, 1996, p. 1-4 (Year: 1996).*

(Continued)

*Primary Examiner* — Kevin H Flynn
*Assistant Examiner* — Ibrahim N El-Bathy
(74) *Attorney, Agent, or Firm* — Sheppard Mullin Richter & Hampton LLP

(57) ABSTRACT

A computer-implemented method for generating certificate for off-line ride hailing comprises: determining a time point associated with an on-line transportation order submission from a computing device; obtaining information of the transportation order, the information comprising at least one of: a time of order, an origin of the transportation, a destination of the transportation, a route of the transportation, a cost for the transportation, a type of the transportation, a user to use the transportation, or remarks inputted by the user for ordering the transportation; monitoring a time lapse from the time point, wherein the transportation order is not picked up during the time lapse; and in response to the time lapse exceeding a threshold, generating a certificate for the user to order another transportation off-line and apply for reimbursement, the certificate including the obtained information.

14 Claims, 6 Drawing Sheets

(51) Int. Cl.
- *G06Q 30/00* (2012.01)
- *G06Q 40/02* (2012.01)
- *G06Q 20/10* (2012.01)
- *H04W 4/029* (2018.01)
- *H04W 4/02* (2018.01)
- *G06Q 20/04* (2012.01)

(52) U.S. Cl.
CPC ......... *G06Q 30/0185* (2013.01); *G06Q 40/02* (2013.01); *G06Q 50/30* (2013.01); *H04W 4/027* (2013.01); *H04W 4/029* (2018.02); *G06Q 2240/00* (2013.01)

(58) Field of Classification Search
CPC ... G06Q 50/30; G06Q 2240/00; H04W 4/029; H04W 4/027
See application file for complete search history.

(56) References Cited

FOREIGN PATENT DOCUMENTS

| | | | |
|---|---|---|---|
| CN | 108038774 A | 5/2018 | |
| WO | 2017091308 A1 | 6/2017 | |
| WO | WO-2017091308 A1 * | 6/2017 | ......... G06Q 30/0283 |
| WO | 2018068659 A1 | 4/2018 | |

OTHER PUBLICATIONS

First Office Action in Chinese Application No. 201680002007.3 dated May 25, 2020, 9 pages.
International Search Report in PCT/CN2018/101631 dated May 10, 2019, 4 pages.
Written Opinion in PCT/CN2018/101631 dated May 10, 2019, 4 pages.

* cited by examiner

320

Certificate

Certificate tracking number: 1100000000629
Order by: John Doe

Oct 11, 2018 8:35pm

Estimated cost: $15.00

From: AAA
To: BBB

Vehicle type: express

Remarks:

Forward with receipt for verfication

View other certificates | Confirm and send to email | Print

┌─────────────────────────────────────────────────────────┐
│ 402: determining a time point associated with an on-line │
│ transportation order submission from a computing device  │
└─────────────────────────────────────────────────────────┘
                              ↓
┌─────────────────────────────────────────────────────────┐
│ 404: obtaining information of the transportation order, the │
│ information comprising at least one of: a time of order, an │
│ origin of the transportation, a destination of the       │
│ transportation, a route of the transportation, a cost for the │
│ transportation, a type of the transportation, a user to use │
│ the transportation, or remarks inputted by the user for  │
│ ordering the transportation                              │
└─────────────────────────────────────────────────────────┘
                              ↓
┌─────────────────────────────────────────────────────────┐
│ 406: monitoring a time lapse from the time point, wherein │
│ the transportation order is not picked up during the time │
│ lapse                                                    │
└─────────────────────────────────────────────────────────┘
                              ↓
┌─────────────────────────────────────────────────────────┐
│ 408: in response to the time lapse exceeding a threshold, │
│ generating a certificate for the user to order another   │
│ transportation off-line and apply for reimbursement, the │
│ certificate including the obtained information           │
└─────────────────────────────────────────────────────────┘

FIG. 4

SYSTEM AND METHOD FOR GENERATING CERTIFICATE FOR OFF-LINE RIDE HAILING

CROSS-REFERENCE TO RELATED APPLICATIONS

This application is a continuation of International Application No. PCT/CN2018/101631, filed on Aug. 22, 2018, the entire contents of which are hereby incorporated by reference.

FIELD OF THE INVENTION

This disclosure generally relates to computer technology, and in particular, to systems and methods for generating certificate for off-line ride hailing.

BACKGROUND

Company employees routinely need transportation for business-related purposes. Traditionally, when on-line ride hailing is unavailable, the employee will have to hire a vehicle off-line, spend personal funds to pay for the transportation, and apply for reimbursement from the company with a paper receipt. Such process is prone to misuses, abuses, and frauds, often causing the company a soaring expenditure.

SUMMARY

Various embodiments of the present disclosure include systems, methods, and non-transitory computer readable media for generating certificate for off-line ride hailing.

According to one aspect, a computer-implemented method for generating certificate for off-line ride hailing comprises: determining a time point associated with an on-line transportation order submission from a computing device; obtaining information of the transportation order, the information comprising at least one of: a time of order, an origin of the transportation, a destination of the transportation, a route of the transportation, a cost for the transportation, a type of the transportation, a user to use the transportation, or remarks inputted by the user for ordering the transportation; monitoring a time lapse from the time point, wherein the transportation order is not picked up during the time lapse; and in response to the time lapse exceeding a threshold, generating a certificate for the user to order another transportation off-line and apply for reimbursement, the certificate including the obtained information.

In some embodiments, in response to the time lapse exceeding the threshold, generating the certificate comprises: in response to the time lapse exceeding the threshold and the obtained information complies with one or more preset conditions, generating the certificate. The one or more preset conditions include at least one of: the time of order being within a time range, the origin being within an origin range, the destination being within a destination range, the cost being within a cost range, or the type of the transportation being an approved type.

In some embodiments, in response to the time lapse exceeding the threshold, generating the certificate comprises: in response to the time lapse exceeding the threshold, notifying the computing device that ordering the another transportation off-line is reimbursable; tracking time-series locations of the computing device for a period of time to determine if the computing device starts moving at a speed range of a moving vehicle in a direction towards the destination; and in response to determining that the computing device starts moving at the speed range of the moving vehicle in the direction towards the destination, generating the certificate.

In some embodiments, the time-series locations comprise Global Positioning System (GPS) positions of the computing device obtained at a series of time stamps.

In some embodiments, generating the certificate comprises generating a unique number to associate with the certificate.

In some embodiments, the method further comprises: obtaining a receipt for the off-line transportation; and in response to the receipt being consistent with the certificate, issuing a credit to an account associated with the computing device.

In some embodiments, the computing device is used by a user associated with an entity; the another computing device is used by an officer associated with the entity; and the off-line transportation is reimbursed by the entity if the receipt and the certificate are accepted after the review.

According to another aspect, a system for generating certificate for off-line ride hailing comprises a processor and a non-transitory computer-readable storage medium storing instructions that, when executed by the processor, cause the processor to perform a method. The method comprises: determining a time point associated with an on-line transportation order submission from a computing device; obtaining information of the transportation order, the information comprising at least one of: a time of order, an origin of the transportation, a destination of the transportation, a route of the transportation, a cost for the transportation, a type of the transportation, a user to use the transportation, or remarks inputted by the user for ordering the transportation; monitoring a time lapse from the time point, wherein the transportation order is not picked up during the time lapse; and in response to the time lapse exceeding a threshold, generating a certificate for the user to order another transportation off-line and apply for reimbursement, the certificate including the obtained information.

According to another aspect, a non-transitory computer-readable storage medium stores instructions that, when executed by a processor, cause the processor to perform a method for generating certificate for off-line ride hailing. The method comprises: determining a time point associated with an on-line transportation order submission from a computing device; obtaining information of the transportation order, the information comprising at least one of: a time of order, an origin of the transportation, a destination of the transportation, a route of the transportation, a cost for the transportation, a type of the transportation, a user to use the transportation, or remarks inputted by the user for ordering the transportation; monitoring a time lapse from the time point, wherein the transportation order is not picked up during the time lapse; and in response to the time lapse exceeding a threshold, generating a certificate for the user to order another transportation off-line and apply for reimbursement, the certificate including the obtained information.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like refer-

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 3B illustrates an exemplary interface for displaying certificate for off-line ride hailing, in accordance with various embodiments.

FIG. 4 illustrates a flowchart of an exemplary method for generating certificate for off-line ride hailing, in accordance with various embodiments.

DETAILED DESCRIPTION

Figure 1:
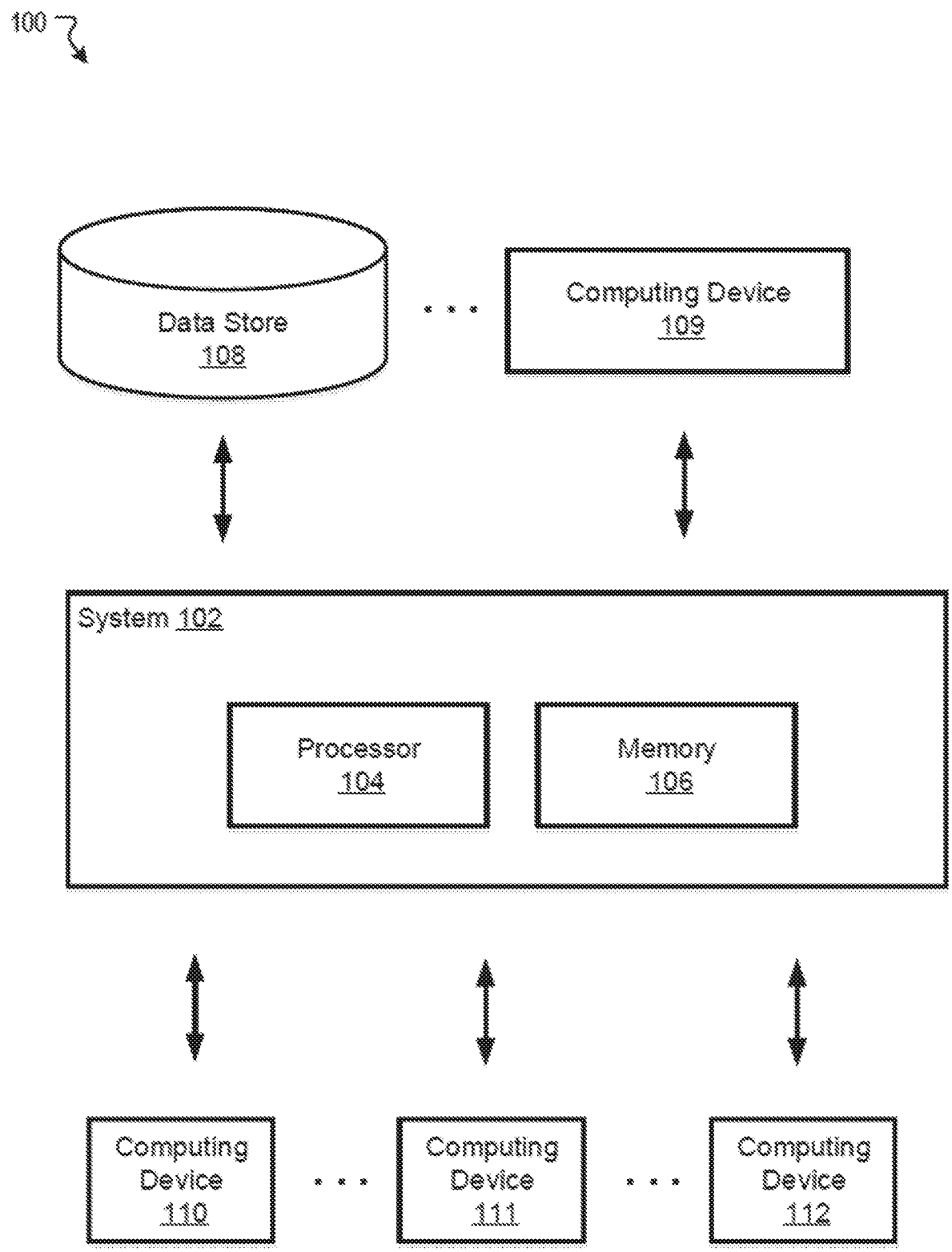
FIG. 1 illustrates an exemplary environment for generating certificate for off-line ride hailing, in accordance with various embodiments.

Company employees routinely need transportation for business-related purposes. Traditionally, when on-line ride hailing is unavailable, the employee will have to hire a vehicle off-line, spend personal funds to pay for the transportation, and apply for reimbursement from the company with a paper receipt. Some company officers may screen the application and make a reimbursement decision. Such process is complicated and time-consuming.

Unlike on-line transportation ordering which generates extensive ride information to substantiate a business use of the ride, the reimbursement process for off-line transportation is prone to misuses, abuses, and frauds due to the dearth of information on the receipts. As a result, the company suffers from a soaring reimbursement expenditure. For example, because the receipt may only show time and cost of the off-line transportation, an employee may fraudulently submit a receipt for an unrelated transportation taken by his friend to apply for reimbursement in the name of his own off-line transportation. For another example, another employee may take a taxi to a bar for personal leisure during a business travel week and submit the receipt in the name of business travel expense. Thus, the lack of verification mechanism for transportations ordered off-line creates significant potential losses for companies.

The disclosed systems and methods can at least mitigate the above-described technical problems of current practice. Various embodiments of the present disclosure include systems, methods, and non-transitory computer readable media for generating certificate for off-line ride hailing. An exemplary method may be implemented through a software with server-end and/or client-end functionalities, such that an entity can streamline employee off-line transportation ordering with enhanced verification. The certificate is generated when on-line transportation order (e.g., placed by a mobile phone) is unavailable for some period of time. The generated certificate for off-line ordering can be used in combination with the off-line receipt for imbursement verification. The certificate may include detailed information of the failed on-line order. Thus, the business use of the off-line transportation can be established if the off-line receipt is consistent with the detailed information on the certificate. Alternatively, the mobile phone can be tracked for some time during the off-line transportation to determine that the off-line transportation complies with the originally ordered on-line transportation. Then, the certificate can be generated. Either way, the certificate generation may also subject to configured settings. For example, the certificate generation may be limited to certain time period or locations. The certificate can be compared with the receipt by a computing device, and reimbursement credit can be issued if the certificate and the receipt are consistent. Thus, the transportation reimbursement can be efficiently processed, tracked, and managed, and misuses and abuses of entity funds can be prevented.

FIG. 1 illustrates an exemplary environment 100 for generating certificate for off-line ride hailing, in accordance with various embodiments. As shown in FIG. 1, the exemplary environment 100 can comprise at least one computing system 102 that includes one or more processors 104 and memory 106. The memory 106 may be non-transitory and computer-readable. The memory 106 may store instructions that, when executed by the one or more processors 104, cause the one or more processors 104 to perform various operations described herein. The system 102 may be implemented on or as various devices such as mobile phone, tablet, server, computer, wearable device, etc. The system 102 above may be installed with appropriate software and/or hardware (e.g., wires, wireless connections, etc.) to access other devices of the environment 100.

The environment 100 may include one or more data stores (e.g., a data store 108) and one or more computing devices (e.g., a computing device 109) that are accessible to the system 102. In some embodiments, the system 102 may be configured to obtain data (e.g., map data, user data) from and/or store data into the data store 108 (e.g., user dataset, map database) and/or the computing device 109 (e.g., computer, server, mobile phone).

The environment 100 may further include one or more computing devices (e.g., computing devices 110, 111, and 112) coupled to the system 102. The each computing device may be, for example, mobile phone, tablet, computer, wearable device (smart watch), etc. The computing devices may each transmit data to and/or receive data from the system 102. The transmitted data may comprise user profile data, time data, location data, etc. The location data may comprise GPS (Global Positioning System) coordinates. The computing device 110 may be associated with a user (e.g., a company employee who is also a passenger of an ordered transportation). The computing device 111 may be associated with a driver (e.g., a driver driving a vehicle for providing transportations). The computing device 112 may be associated with an entity authority (e.g., a manager of the company).

The computing devices 110, 111, and 112 may have different interfaces and functions tailored for corresponding user groups. For example, the computing device 110 may install a passenger-end software version, and the passenger may access the software by logging into a passenger account. The computing device 111 may install a driver-end software version, and the driver may access the software by logging into a driver account. The software installed on the computing devices 110 and 111 together with the system 102 may provide the vehicle hailing function described above. The computing device 112 may install a company-end software version, and a company manager may access the software by logging into a company account. The company is defined broadly and may include any type of organization or a group of organizations. Although employee-company relation is used as an example for transportation reimbursement, the disclosed systems and methods can apply to any person-organization relationship for any off-line activity verification.

In some embodiments, the system 102 may implement an on-line information or service platform (e.g., in the form of a software application described herein). The platform may be referred to as a vehicle platform (or service hailing platform, ride order dispatching platform). The service may be associated with vehicles (e.g., cars, bikes, boats, airplanes, etc.). The platform may accept requests for transportation, identify vehicles to fulfill the requests, arrange for pick-ups, and process transactions. For example, a user may use the computing device 110 (e.g., a mobile phone installed with the software application associated with the platform) to request transportation from the platform. The system 102 may receive the request (e.g., including a pick-up time, a pick-up location, and a destination) and relay it to various vehicle drivers (e.g., by posting the request to mobile phones carried by the drivers). A vehicle driver may use the computing device 111 (e.g., another mobile phone installed with the application associated with the platform) to accept the posted transportation request, proceed to the pick-up location, and transport the user to the destination. Fees (e.g., transportation fees) can be transacted among the system 102 and the computing devices 110 and 111. Some platform data may be stored in the memory 106 or retrievable from the data store 108 and/or the computing devices 109, 110, and 111. For example, for each trip, the locations of the origin and destination (e.g., transmitted by the computing devices 110 and/or 111), the fee, and the time can be obtained by the system 102.

In some embodiments, the system 102 and the one or more of the computing devices (e.g., the computing device 109) may be integrated in a single device or system. Alternatively, the system 102 and the one or more computing devices may operate as separate devices. The data store(s) may be anywhere accessible to the system 102, for example, in the memory 106, in the computing device 109, in another device (e.g., network storage device) coupled to the system 102, or another storage location (e.g., cloud-based storage system, network file system, etc.), etc. Although the system 102 and the computing device 109 are shown as single components in this figure, it is appreciated that the system 102 and the computing device 109 can be implemented as single devices or multiple devices coupled together. The system 102 may be implemented as a single system or multiple systems coupled to each other. In general, the system 102, the computing device 109, the data store 108, and the computing device 110, 111, and 112 are able to communicate with one another through one or more wired or wireless networks (e.g., the Internet) through which data is communicated. Various aspects of the environment 100 are described below in reference to FIG. 2 to FIG. 5.

Figure 2:
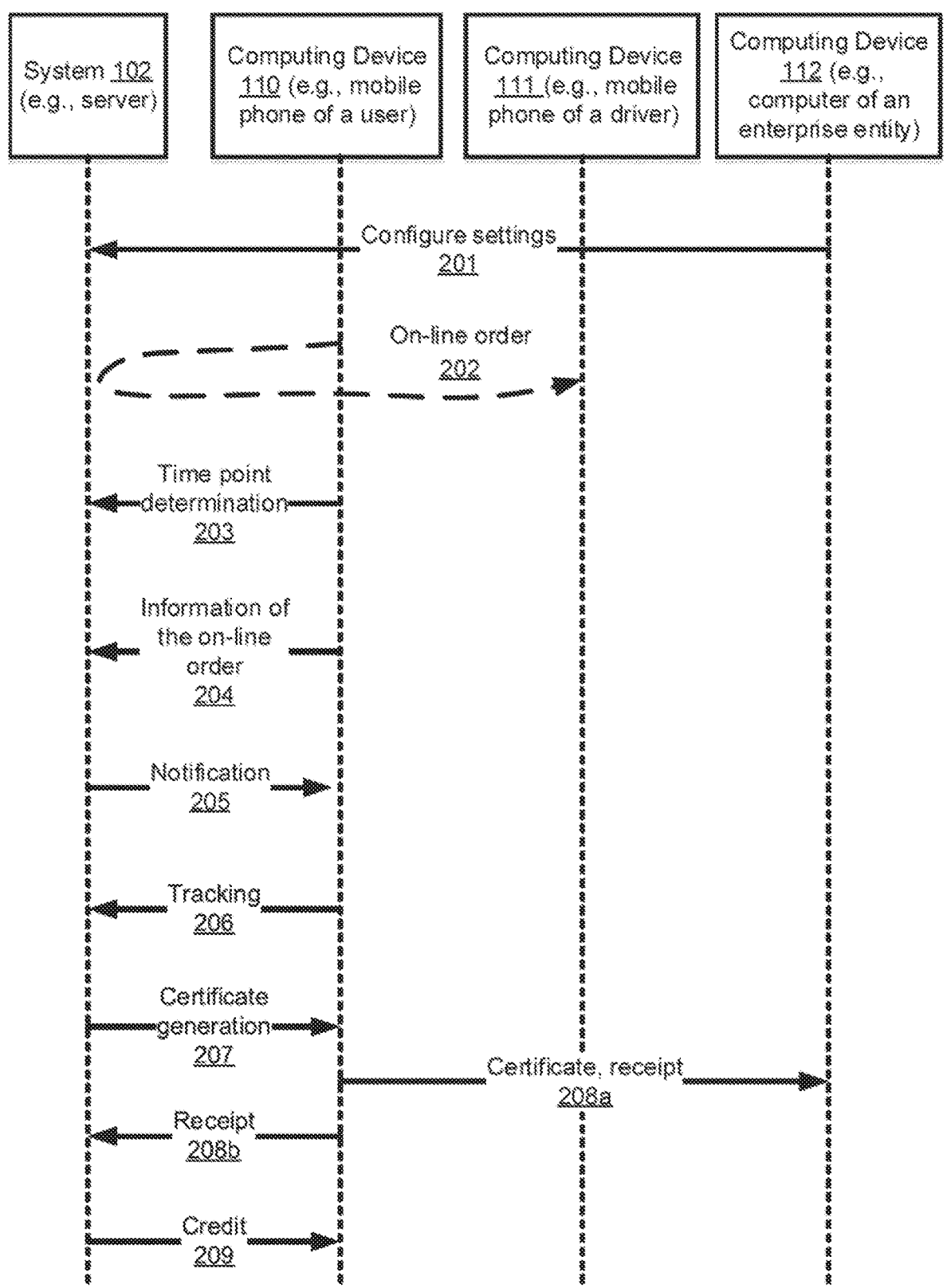
FIG. 2 illustrates an exemplary system interaction for generating certificate for off-line ride hailing, in accordance with various embodiments.

FIG. 2 illustrates an exemplary system interaction for generating certificate for off-line ride hailing, in accordance with various embodiments. The operations shown in FIG. 2 and presented below are intended to be illustrative. Depending on the implementation, the operations shown in FIG. 2 and presented below may include additional, fewer, or alternative steps performed in various orders or in parallel.

FIG. 2 illustrates a system 102 (e.g., server), a computing device 110 (e.g., mobile phone used by an employee), a computing device 111 (e.g., mobile phone used by a driver), and a computing device 112 (e.g., computer of a manager of an entity) described above with reference to FIG. 1. To access the computing device 110, 111, or 112, the user may need to log into a corresponding account or otherwise authenticate the identity. For example, an employee account authentication may be required for performing various steps (described below) through the computing device 110, a driver account authentication may be required for performing various steps (described below) through the computing device 111, and a configuration account authentication may be required for performing various steps (described below) through the computing device 112.

Thus, the computing device 110, 111, or 112 shown in this figure may each represent one or more computing devices, and the user can access any of the computing devices to perform the described steps as long as authenticating through the corresponding account. For example, a manager may configure settings for transportation reimbursement (e.g., at step 201) from a personal laptop, and later the same manager or a different manager may review the certificate and off-line transportation receipt (e.g., at step 208a) from a personal mobile phone.

FIG. 2 illustrates interactions among the system 102 and the computing devices 110, 111, and 112. The operations of the interaction presented below are intended to be illustrative. Depending on the implementation, the operations may include additional, fewer, or alternative steps performed in various orders or in parallel.

In some embodiments, at step 201, the computing device 112 may configure settings for certificate generation. For example, based on the configuration, the certificate for off-line ride hailing may be generated when one or more preset conditions are fulfilled. One condition can be that the time of order is within a time range. For example, the company may want to limit reimbursement to over-time work day transportation. Thus, the on-line transportation as ordered (but failed) has to be after a certain time, e.g., 9 pm. Another condition can be that the origin or destination of the order is within a geographical range. For example, the company may want to limit business travel reimbursement to transportations taken at the visiting city. Thus, the origin and the destination of the on-line transportation order have to be within the city boundary. Similarly, the company may limit the budget by imposing a cost range, such that only failed on-line orders having estimated costs within the cost range can generate certificates. The company may also limit the type of the transportation by setting one or more approved vehicle types, e.g., comfort, express, etc.

At step 202, a user may use the computing device 110 to order a transportation ride on-line. The order may be broadcasted by the system 102 to a plurality of computing devices of vehicle drivers nearby. At step 203, the system 102 may determine a time point that the computing device 110 submitted the on-line transportation order. At step 204, the system 102 may obtain information of the on-line transportation order. The information may comprise: a time of order (e.g., time when the computing device 110 places the order), an origin of the transportation (e.g., a location inputted by the computing device 110), a destination of the transportation (e.g., a location inputted by the computing device 110), a route of the transportation (e.g., a route generated by the system 102), a cost for the transportation (e.g., a cost estimated by the system 102), a type of the transportation (e.g., a vehicle type chosen by the computing device 110 and/or the system 102), a user to use the transportation (e.g., name of a user account that placed the order), and/or remarks inputted by the user for ordering the transportation (e.g., over-time travel to home). Steps 203 and 204 may be performed concurrently or at any order. The system 102 may monitor a time lapse from the time point of on-line order submission. At step 205, if the on-line transportation order is not picked up by any driver for more than a threshold (e.g., five minutes, ten minutes) and/or if the obtained information complies with the one or more preset conditions (see step 201 above), the system 102 may notify the computing device 110 that off-line transportation ordering is now allowed. The system 102 may notify the computing device 110 that ordering a transportation off-line (e.g., within the next 30 minutes) is reimbursable. The one or more preset conditions may include: the time of order being within a time range, the origin being within an origin range, the destination being within a destination range, the cost being within a cost range, and/or the type of the transportation being an approved type. Optionally, the certificate may be generated when the threshold is exceeded.

Alternatively, at step 206, the system 102 may track time-series locations of the computing device 110 for a period of time (e.g., one hour) to determine if the computing device starts moving at a speed range of a moving vehicle in a direction towards the destination. The time-series locations comprise Global Positioning System (GPS) positions of the computing device obtained at a series of time stamps (e.g., every five seconds). For example, if the user successfully orders a vehicle off-line and boards the vehicle, the user's computing device 110 should be moving at a regular vehicle speed much faster than walking speed. The system 102 may obtain information of other vehicles in the nearby region to determine an average speed as the speed range of the moving vehicle, thus factoring traffic condition into account. Also, the user on board of the vehicle ordered off-line should be moving towards the originally planned destination entered for the on-line order. Thus, by tracking the moving speed and moving direction of the computing device 110, the system 102 may determine that the user has boarded a vehicle consistent with the original travel plan submitted for the on-line order.

At step 207, in response to (1) the time lapse exceeding the threshold, (2) the obtained information complies with one or more preset conditions, and/or (3) determining that the computing device starts moving at the speed range of the moving vehicle in the direction towards the destination, the system 102 may generate the certificate. The certificate may include the obtained information. The certificate may have a unique number to associate with the certificate.

At step 208*a*, the computing device 110 may forward a receipt of the off-line transportation (e.g., e-receipt, an image of a paper receipt) and the certificate to the computing device 111 for review and approval. For example, the computing device 110 is used by a user associated with an entity, the computing device 112 is used by an officer associated with the entity, and the off-line transportation is reimbursed by the entity if the receipt and the certificate are accepted after the review. Alternatively, at step 208*b*, the system 102 may obtain the receipt for the off-line transportation. In response to the receipt being consistent with the certificate (e.g., through information extraction and comparison), the system 102 may issue a credit to an account associated with the computing device 110 from the company's account to reimburse the off-line transportation.

Figure 3A:
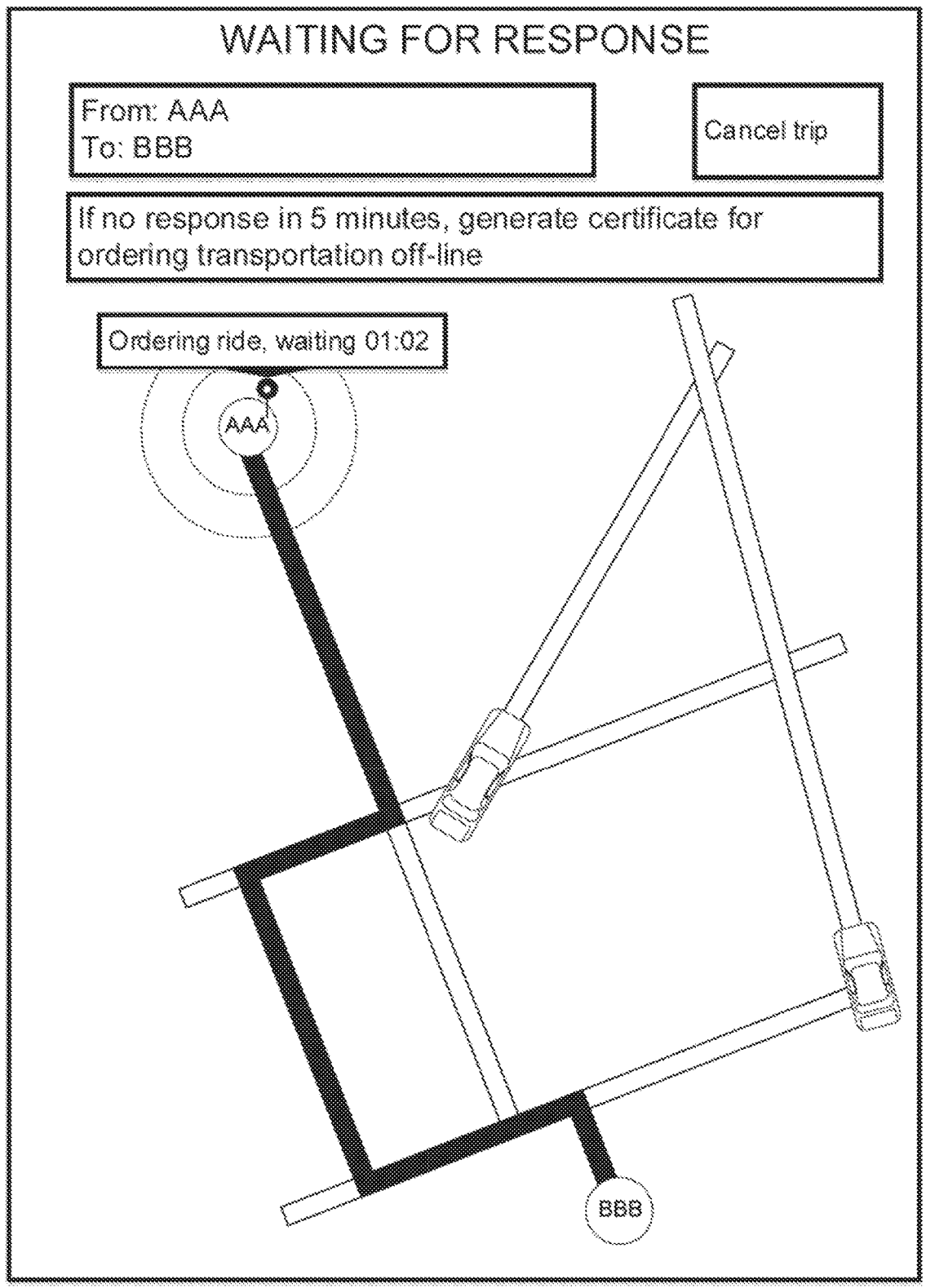
FIG. 3A illustrates an exemplary interface for ordering ride on-line, in accordance with various embodiments.

FIGS. 3A-3B illustrate exemplary interfaces of an application for generating certificate for off-line ride hailing, in accordance with various embodiments. The operations shown in FIGS. 3A-3B and presented below are intended to be illustrative.

FIG. 3A illustrates an exemplary interface 310 for ordering ride on-line, in accordance with various embodiments. As shown, the user has submitted an order on-line for ride hailing. The ordered ride is from an origin AAA to a destination BBB. The order was placed one minute and two seconds ago, as the interface shows that 1:02 has passed since the order. On the map, a few vehicles may be around, but no vehicle is available or willing to take the order. The interface notifies the user that if no response is received in five minutes, a certificate may be generated for ordering transportation off-line.

FIG. 3B illustrates an exemplary interface 320 for displaying certificate for off-line ride hailing, in accordance with various embodiments. The certificate shows the travel plan that was not fulfilled by the on-line ride hailing, and provides a basis for consistency verification against the off-line ride hailing that later resorted to. As shown, the certificate may have a unique tracking number, a name of the user, a date and time of the on-line order, an estimated price generated for the on-line order, an origin and destination for the on-line order, a vehicle type planned for the on-line order, and/or remarks inputted by the user for the on-line order. The user may view other certificates, send the certificate to email (e.g., to manager for review), print the certificate, or forward the certificate with off-line transportation receipt for verification.

As described, the software system with server and client ends may generate certificate for off-line ride hailing. The enterprise can easily configure and manage transportation reimbursement approval and tracking from the enterprise-end software, with assurance that the computing system verifies the off-line transportation order in accordance with the failed on-line order and preset conditions. The employees are provided with convenience to streamline the reimbursement process. Thus, reimbursement misuses, abuses, and frauds can be prevented. Company resources previously spent on reimbursement program management can now be conserved and put in use elsewhere.

FIG. 4 illustrates a flowchart of an exemplary method 400 for generating certificate for off-line ride hailing, according to various embodiments of the present disclosure. The method 400 may be implemented in various environments including, for example, the environment 100 of FIG. 1. The exemplary method 400 may be implemented by one or more components of the system 102 (e.g., the processor 104, the memory 106). An exemplary system 102 may include a server. The exemplary method 400 may be implemented by multiple systems similar to the system 102. The operations of method 400 presented below are intended to be illustrative. Depending on the implementation, the exemplary method 400 may include additional, fewer, or alternative steps performed in various orders or in parallel.

Block 402 comprises determining a time point associated with an on-line transportation order submission from a computing device. Block 404 comprises obtaining information of the transportation order, the information comprising at least one of: a time of order, an origin of the transportation, a destination of the transportation, a route of the transportation, a cost for the transportation, a type of the transportation, a user to use the transportation, or remarks inputted by the user for ordering the transportation. Block 406 comprises monitoring a time lapse from the time point, wherein the transportation order is not picked up during the time lapse. Block 408 comprises in response to the time lapse exceeding a threshold, generating a certificate for the user to order another transportation off-line and apply for reimbursement, the certificate including the obtained information.

In some embodiments, in response to the time lapse exceeding the threshold, generating the certificate comprises: in response to the time lapse exceeding the threshold and the obtained information complies with one or more preset conditions, generating the certificate. The one or more preset conditions include at least one of: the time of order being within a time range, the origin being within an origin range, the destination being within a destination range, the cost being within a cost range, or the type of the transportation being an approved type.

In some embodiments, in response to the time lapse exceeding the threshold, generating the certificate comprises: in response to the time lapse exceeding the threshold, notifying the computing device that ordering the another transportation off-line is reimbursable; tracking time-series locations of the computing device for a period of time to determine if the computing device starts moving at a speed range of a moving vehicle in a direction towards the destination; and in response to determining that the computing device starts moving at the speed range of the moving vehicle in the direction towards the destination, generating the certificate.

In some embodiments, the time-series locations comprise Global Positioning System (GPS) positions of the computing device obtained at a series of time stamps.

In some embodiments, generating the certificate comprises generating a unique number to associate with the certificate.

In some embodiments, the method further comprises: obtaining a receipt for the off-line transportation; and in response to the receipt being consistent with the certificate, issuing a credit to an account associated with the computing device.

In some embodiments, the computing device is used by a user associated with an entity; the another computing device is used by an officer associated with the entity; and the off-line transportation is reimbursed by the entity if the receipt and the certificate are accepted after the review. Further details of the method 400 can be referred to FIGS. 1-3B above.

The techniques described herein are implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
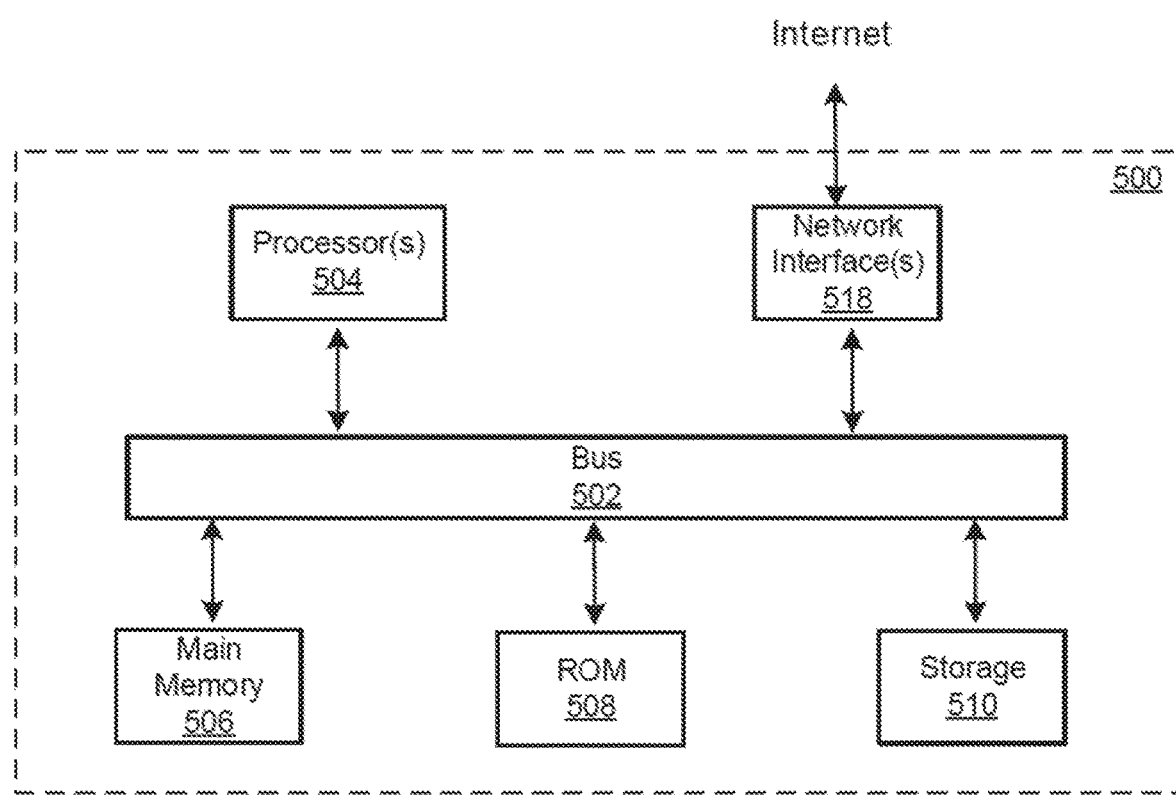
FIG. 5 illustrates a block diagram of an exemplary computer system in which any of the embodiments described herein may be implemented.

FIG. 5 is a block diagram that illustrates a computer system 500 upon which any of the embodiments described herein may be implemented. The system 500 may correspond to the system 102 described above. The computer system 500 includes a bus 502 or other communication mechanism for communicating information, one or more hardware processors 504 coupled with bus 502 for processing information. Hardware processor(s) 504 may be, for example, one or more general purpose microprocessors. The processor(s) 504 may correspond to the processor 104 described above.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. The main memory 506, the ROM 508, and/or the storage 510 may correspond to the memory 106 described above.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to a media that store data and/or instructions that cause a machine to operate in a specific fashion. The media excludes transitory signals. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a network interface 518 coupled to bus 502. Network interface 518 provides a two-way data communication coupling to one or more network links that are connected to one or more local networks. For example, network interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

The computer system 500 can send messages and receive data, including program code, through the network(s), network link and network interface 518. In the Internet example, a server might transmit a requested code for an application program through the Internet, the ISP, the local network and the network interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed exemplary embodiments. The exemplary systems and components described herein may be configured differently than described. For example, elements may be added to, removed from, or rearranged compared to the disclosed exemplary embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS).

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although an overview of the subject matter has been described with reference to specific exemplary embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The invention claimed is:

1. A computer-implemented method for generating a certificate for off-line ride hailing, comprising:
   determining a time point associated with an on-line transportation order submission from a computing device;
   obtaining information of the on-line transportation order, the information comprising at least one of: a time of the on-line transportation order, an origin of the on-line transportation, a destination of the on-line transportation order, a route of the on-line transportation order, a cost for the on-line transportation order, a type of the on-line transportation order, a user to use the on-line transportation order, or remarks inputted by the user for ordering the on-line transportation order;

monitoring a time lapse from the time point, wherein the on-line transportation order is not picked up during the time lapse;

in response to the time lapse exceeding a threshold, notifying the computing device that an off-line transportation order is reimbursable;

tracking time-series locations of the computing device for a period of time to determine that the computing device starts moving at a speed range of a moving vehicle in a direction towards the destination; and in response to determining that the computing device starts moving at the speed range of the moving vehicle in the direction towards the destination, generating the certificate for the user to order the off-line transportation order and apply for reimbursement; wherein:

the certificate includes the obtained information, and the time-series locations comprise Global Positioning System (GPS) positions of the computing device obtained at a series of time stamps.

2. The method of claim 1, wherein:

the obtained information complies with one or more preset conditions; and the one or more preset conditions include at least one of: the time of the on-line transportation order being within a time range, the origin being within an origin range, the destination being within a destination range, the cost being within a cost range, or the type of the on-line transportation order being an approved type.

3. The method of claim 1, wherein:

generating the certificate comprises generating a unique number to associate with the certificate.

4. The method of claim 1, further comprising:

obtaining a receipt for the off-line transportation order; and in response to the receipt being consistent with the certificate, issuing a credit to an account associated with the computing device.

5. The method of claim 4, wherein:

the computing device is used by a user associated with an entity;

another computing device is used by an officer associated with the entity; and the off-line transportation order is reimbursed by the entity if the receipt and the certificate are accepted after a review.

6. A system for generating a certificate for off-line ride hailing, comprising a processor and a non-transitory computer-readable storage medium storing instructions that, when executed by the processor, cause the processor to perform a method, the method comprising:

determining a time point associated with an on-line transportation order submission from a computing device;

obtaining information of the on-line transportation order, the information comprising at least one of: a time of the on-line transportation order, an origin of the on-line transportation order, a destination of the on-line transportation order, a route of the on-line transportation order, a cost for the on-line transportation order, a type of the on-line transportation order, a user to use the on-line transportation order, or remarks inputted by the user for ordering the on-line transportation order;

monitoring a time lapse from the time point, wherein the on-line transportation order is not picked up during the time lapse;

in response to the time lapse exceeding a threshold, notifying the computing device that ordering on-line transportation order is reimbursable;

tracking time-series locations of the computing device for a period of time to determine if the computing device starts moving at a speed range of a moving vehicle in a direction towards the destination; and in response to determining that the computing device starts moving at the speed range of the moving vehicle in the direction towards the destination, generating the certificate for the user to order the off-line transportation order and apply for reimbursement; wherein:

the certificate includes the obtained information, and the time-series locations comprise Global Positioning System (GPS) positions of the computing device obtained at a series of time stamps.

7. The system of claim 6, wherein:

the obtained information complies with one or more preset conditions, generating the certificate; and the one or more preset conditions include at least one of: the time of the transportation order being within a time range, the origin being within an origin range, the destination being within a destination range, the cost being within a cost range, or the type of the on-line transportation order being an approved type.

8. The system of claim 6, wherein:

generating the certificate comprises generating a unique number to associate with the certificate.

9. The system of claim 6, wherein the method further comprises:

obtaining a receipt for the off-line transportation order; and in response to the receipt being consistent with the certificate, issuing a credit to an account associated with the computing device.

10. The system of claim 9, wherein:

the computing device is used by a user associated with an entity;

another computing device is used by an officer associated with the entity; and the off-line transportation order is reimbursed by the entity if the receipt and the certificate are accepted after a review.

11. A non-transitory computer-readable storage medium storing instructions that, when executed by a processor, cause the processor to perform a method for generating a certificate for off-line ride hailing, the method comprising:

determining a time point associated with an on-line transportation order submission from a computing device;

obtaining information of the on-line transportation order, the information comprising at least one of: a time of the on-line transportation order, an origin of the on-line transportation order, a destination of the on-line transportation order, a route of the on-line transportation order, a cost for the on-line transportation oreder, a type of the on-line transportation order, a user to use the on-line transportation order, or remarks inputted by the user for ordering the on-line transportation order;

monitoring a time lapse from the time point, wherein the transportation order is not picked up during the time lapse;

in response to the time lapse exceeding a threshold, notifying the computing device that ordering an off-line transportation order is reimbursable;

tracking time-series locations of the computing device for a period of time to determine that the computing device starts moving at a speed range of a moving vehicle in a direction towards the destination; and in response to determining that the computing device starts moving at the speed range of the moving vehicle in the direction towards the destination, generating the certificate for the user to order the off-line transportation order and apply for reimbursement; wherein:

the certificate includes the obtained information, and the time-series locations comprise Global Positioning System (GPS) positions of the computing device obtained at a series of time stamps.

12. The storage medium of claim 11, wherein:

the obtained information complies with one or more preset conditions, generating the certificate; and the one or more preset conditions include at least one of: the time of the transportation order being within a time range, the origin being within an origin range, the destination being within a destination range, the cost being within a cost range, or the type of the on-line transportation order being an approved type.

13. The storage medium of claim 11, wherein:

generating the certificate comprises generating a unique number to associate with the certificate.

14. The storage medium of claim 11, wherein the method further comprises:

obtaining a receipt for the off-line transportation order; and in response to the receipt being consistent with the certificate, issuing a credit to an account associated with the computing device.

\* \* \* \* \*

UNITED STATES PATENT AND TRADEMARK OFFICE
CERTIFICATE OF CORRECTION

PATENT NO. : 10,902,432 B2
APPLICATION NO. : 16/928033
DATED : January 26, 2021
INVENTOR(S) : Tao Liu and Tuoya Wulan Page 1 of 1

It is certified that error appears in the above-identified patent and that said Letters Patent is hereby corrected as shown below:

In the Claims

In Claim 1, Column 12, Line 64:
"transportation, a destination of the on-line" should read --transportation order, a destination of the on-line--.

In Claim 6, Column 14, Line 2:
"notifying the computing device that ordering on-line" should read --notifying the computing device that ordering an off-line--.

In Claim 7, Column 14, Line 22:
"the time of the transportation order being within a time" should read --the time of the on-line transportation order being within a time--.

In Claim 11, Column 14, Line 56:
"a cost for the on-line transportation oreder" should read --a cost for the on-line transportation order--.

In Claim 12, Column 15, Line 16:
"the time of the transportation order" should read --the time of the on-line transportation order--.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*